Figure 1:
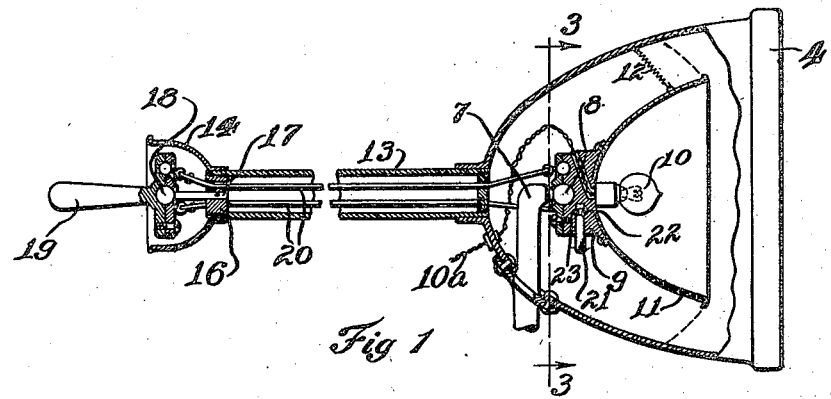

July 1, 1924.

L. D. COPELAND

DIRIGIBLE LAMP

Filed Nov. 16, 1921

1,499,640

INVENTOR.
Lucius D. Copeland
BY
ATTORNEY

Patented July 1, 1924.

1,499,640

UNITED STATES PATENT OFFICE.

LUCIUS D. COPELAND, OF SAWTELLE, CALIFORNIA.

DIRIGIBLE LAMP.

Application filed November 16, 1921. Serial No. 515,529.

*To all whom it may concern:*

Be it known that I, LUCIUS D. COPELAND, a citizen of the United States, residing at Sawtelle, in the county of Los Angeles, State of California, have invented new and useful Improvements in Dirigible Lamps, of which the following is a specification.

My invention relates to any type of lamp the light of which is usually thrown in one general direction and the direction of which it is desirable at times to change but is primarily designed for use on an automobile or other motor driven vehicles.

In the operation of a motor driven vehicle at night the glare of horizontally and forwardly directed headlights is objectionable to meeting vehicles. It is the object of my invention to provide suitable mechanism whereby the driver of a motor vehicle can direct from his seat the direction in which the light rays shall be thrown within reasonable limits so that he may prevent the rays of light from striking the face of the driver of a meeting vehicle, and when desirable he can direct the rays of light from the lamps of his machine so that in turning a corner he can direct the rays of light around the corner before the machine reaches the corner, or can examine objects at either side of the road. A further object is to so mount and connect the front lamps of an automobile that they will move synchronously by mechanism directly connected to one lamp.

Figure 2:
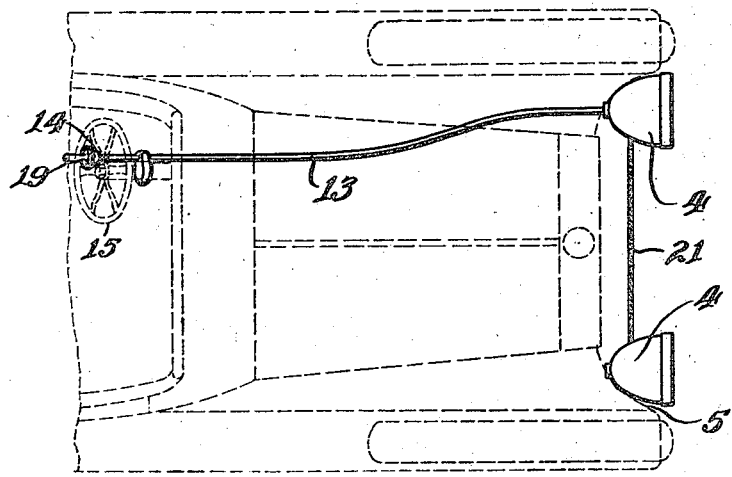
Figure 3:
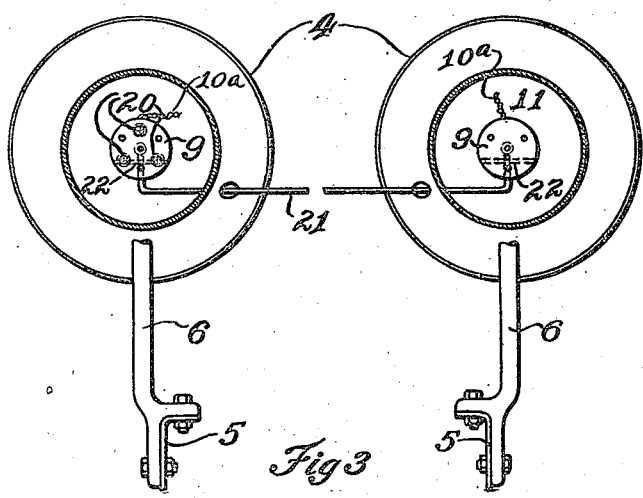

In the drawings forming a part of this application:

Fig. 1 is an enlarged diagrammatic sectional detail of an automobile lamp detached from the vehicle. Fig. 2 is a top plan of the lamps with a portion of the machine shown in dotted lines. Fig. 3 is a section on the line 3—3 of Fig. 1.

Referring to the drawings, 4 are the usual outer casings of the lamp holders which are attached to the frame 5 of the machine in the usual manner. These casings carry the usual front lenses.

Posts 6 are attached to any suitable part of the frame of the machine and extend into the lamp holder casings. These posts have forwardly projecting arms 7 which terminate in round knobs 8. Mounted on knobs 8 for rotative movement are lamp blocks 9 on which are mounted the usual head light lamps 10 to which wires 10ª are connected. These wires run to a source of controlled electric energy not shown. Secured to blocks 9 are the reflectors 11. These reflectors may be normally held positioned to throw the light from the lamps straight ahead by springs attached thereto and to casing 4. In Fig. 1 I have shown one of these springs 12, of which there are a sufficient number. Connected to and extending from one of casings 5 is tube 13 which terminates in a bellshaped mouth 14 just below the usual steering wheel 15 shown in dotted lines. Secured in tube 13 adjacent to mouth 14 is a pierced plug 16 from which projects a rod 17 which terminates in a rounded end or knob 18. Mounted on knob 18 for rotative movement is the control handle 19. Running from the base of the control handle through tube 13 to and connected to block 9 are a plurality of wires 20. In the drawings I have shown three as I have found in practice that three enable me to direct the light of the lamps in the desired directions. While I have shown these wires extending through a single tube I may enclose each wire in an independent tube. The lamp blocks are connected by a cross bar 21 so that when the block that is connected by wires to the control handle is operated the other block moves in synchronism with it. By moving the control handle the light of the lamps is thrown in the desired direction. When the control handle is released the springs return the lamps to their normal position.

By this construction I have provided a cheap method of installation and rendering operation of the lamps very simple.

Having described my invention I claim—

In an automobile the combination of lamp holder casings attached to the frame of the machine; posts secured to the frame of the machine, said posts extending into said casings and having arms terminating in rounded knobs; lamp blocks mounted on said knobs for rotative movement; lamps and reflectors mounted on said blocks; a rod connecting the block in one casing with the block in the other casing; a tube extending from one of the lamp holder casings to the steering wheel of the machine; a pierced plug in said tube adjacent the steering wheel; a rod projecting from said plug, said rod terminating in a round knob; a control handle mounted on said last knob for rotative movement; wires extending from the base of said control handle to and connected to said lamp block; and springs connected to the reflectors and to the lamp holder casings.

In witness that I claim the foregoing I have hereunto subscribed my name this 10th day of Nov., 1921.

LUCIUS D. COPELAND.